(12) United States Patent
Eberle et al.

(10) Patent No.: US 11,241,935 B2
(45) Date of Patent: Feb. 8, 2022

(54) MOTOR VEHICLE AIR-CONDITIONING SYSTEM

(71) Applicant: Mahle International GmbH, Stuttgart (DE)

(72) Inventors: Daniel Eberle, Stuttgart (DE); Rainer Knoeller, Jettingen (DE); Markus Michael, Ilsfeld (DE); Anja Reiter, Schorndorf (DE); Oliver Schultze, Stuttgart (DE); Isabelle Seitz, Stuttgart (DE); Joachim Treier, Oppenau (DE); Walter Wolf, Oppenweiler-Zell (DE)

(73) Assignee: Mahle International GmbH

( * ) Notice: Subject to any disclaimer, the term of this patent is extended or adjusted under 35 U.S.C. 154(b) by 352 days.

(21) Appl. No.: 16/120,432

(22) Filed: Sep. 3, 2018

(65) Prior Publication Data
US 2019/0070922 A1  Mar. 7, 2019

(30) Foreign Application Priority Data

Sep. 4, 2017 (DE) ...................... 10 2017 215 457.8

(51) Int. Cl.
*B60H 1/00* (2006.01)
*B60H 3/06* (2006.01)

(52) U.S. Cl.
CPC ......... *B60H 1/008* (2013.01); *B60H 1/00792* (2013.01); *B60H 3/0608* (2013.01); *B60H 2003/0683* (2013.01)

(58) Field of Classification Search
CPC .. B60H 1/008; B60H 1/00792; B60H 3/0608; B60H 2003/0683
See application file for complete search history.

(56) References Cited

U.S. PATENT DOCUMENTS

| 4,795,090 A | 1/1989 | Koukal et al. |
| 5,377,528 A | 1/1995 | Dauvergne |

(Continued)

FOREIGN PATENT DOCUMENTS

| DE | 35 41 263 A1 | 5/1987 |
| DE | 43 21 371 A1 | 2/1994 |

(Continued)

OTHER PUBLICATIONS

English abstract for KR-1020100130938.
English abstract for EP-1 504 937.

*Primary Examiner* — Gordon A Jones
(74) *Attorney, Agent, or Firm* — Fishman Stewart PLLC

(57) ABSTRACT

An air-conditioning system comprises a channel system, a system conveying device positioned in the channel system and configured to convey air in the channel system, a sensor device comprising at least one analysis channel and configured to measure a characteristic of air flowing through the at least one analysis channel, and a suction jet pump comprising a motive-fluid inlet, a suction inlet, and a pump outlet. The system conveying device separates a suction area of the channel system arranged upstream of the system conveying device from a pressure area of the channel system arranged downstream from the system conveying device, and the sensor device further comprises a sensor outlet configured to release air from the sensor device. The motive-fluid inlet is fluidically connected to the pressure area via a suction jet branch-off point within the channel system, and the suction inlet is fluidically connected to the sensor outlet.

17 Claims, 5 Drawing Sheets

(56) References Cited

U.S. PATENT DOCUMENTS

| | | | |
|---|---|---|---|
| 5,868,312 A | 2/1999 | Feldt | |
| 5,955,803 A * | 9/1999 | Gandhi | H02K 9/06 310/52 |
| 6,406,275 B1 * | 6/2002 | Hoehn | F04D 25/082 417/366 |
| 2010/0043527 A1 * | 2/2010 | Marra | B03C 3/08 73/28.02 |
| 2019/0023099 A1 * | 1/2019 | Li | B60H 1/00978 |
| 2019/0346359 A1 * | 11/2019 | Kinugasa | G01N 15/1404 |
| 2020/0109869 A1 * | 4/2020 | Makipaa | A61L 9/22 |

FOREIGN PATENT DOCUMENTS

| | | |
|---|---|---|
| DE | 197 31 748 A1 | 2/1998 |
| EP | 1 504 937 A1 | 2/2005 |
| KR | 1020100130938 | 12/2010 |

\* cited by examiner

MOTOR VEHICLE AIR-CONDITIONING SYSTEM

CROSS-REFERENCE TO RELATED APPLICATION

This application claims priority to German Application No. DE 10 2017 215 457.8 filed on Sep. 4, 2017, the contents of which are hereby incorporated by reference in its entirety.

TECHNICAL FIELD

The present invention relates to an air-conditioning system of a motor vehicle for air-conditioning a motor vehicle interior. The invention furthermore relates to a motor vehicle with such an air-conditioning system.

BACKGROUND

During the operation of an air-conditioning system, air or an air flow is supplied to a motor vehicle interior of a related vehicle in order to air-condition the vehicle interior. Thereby, this airflow can be air-conditioned with the aid of at least one heat exchanger of the air-conditioning system, wherein the change of the temperature of the air flow and/or the humidity of the air flow is understood under air-conditioning in the present document. Thereby, it is desirable to know the characteristics of the air flow, which is supplied to the vehicle interior in order to operate the air-conditioning system accordingly.

From DE 35 41 263 A1, it is known to provide an air-conditioning system with a temperature sensor, which the air to be supplied to the vehicle interior is applied to with the aid of an air jet pump. Depending on the temperature measured with the aid of the temperature sensor, a heat exchanger of the air-conditioning system is operated in order to adapt the temperature to the air to be supplied to the vehicle interior.

It is also desirable to measure a characteristic of the air reflecting a grade or quality within the air-conditioning system and/or that of the air-conditioning system in order to provide the air-conditioning system with outside air, for example, if the quality or grade of the outside air is sufficiently higher with respect to this. For this purpose, sensor devices are necessary that record such a characteristic. Thereby, it is required that a corresponding air flow is led through the sensor device, wherein the guidance of this air flow through the sensor device requires a corresponding conveyance of the air.

Such a sensor device of an air-conditioning system is known from DE 43 21 371 A1, wherein the sensor device has a sensor inlet as well as a sensor outlet, which communicate with an interior space within a housing of the sensor device and thorough which the air flows in order to be led by sensors arranged in the housing, which determine such a characteristic of the air. The conveyance of the air is implemented via a circulation pump arranged in the housing.

In particular, the elaborate design of the said sensor device and its fluidic connections are a disadvantage in the case of the air-conditioning systems and related motor vehicles known from the most recent prior art. Furthermore, it is desirable to design such an air-conditioning system in the most assembly-space saving manner possible.

SUMMARY

The present invention therefore deals with the task to indicate improved or at least alternative embodiments for an air-conditioning system of the aforementioned type, as well as for a motor vehicle with such an air-conditioning system, which are particularly characterized by a simplified construction and/or reduced assembly-space requirements.

According to the invention, the task is achieved by means of the features of the independent claims. Favourable embodiments are the object of the dependent claims.

The present invention is based on the general idea, in the case of an air-conditioning system to air-condition a motor vehicle interior of a vehicle, to use a suction jet pump to propel an air flow led through the sensor device and to arrange this suction jet pump outside of the sensor device. The use of a suction jet pump to convey the air leads to a simplified construction of the air-conditioning system, as well as to an increased operational safety of the same. Due to the arrangement of the suction jet pump outside of the sensor device, the sensor device can be additionally manufactured in a compact manner and, as a consequence, it can be placed accordingly so that the air-conditioning system can be implemented in an overall assembly-space saving manner. According to the inventive idea, the air-conditioning system comprises a channel system that air flows through during operation, in which a conveying device is arranged to convey air. The conveying device, hereinafter also referred to as system conveying device, divides the channel system into a suction area arranged upstream to the conveying device and a pressure area arranged downstream to the conveying device. The sensor device serves to measure at least one characteristic of air, wherein this air flows through an analysis channel of the sensor device. The sensor device additionally has a sensor outlet to let out air from the sensor device. According to the invention, it is provided that the air-conditioning system comprises a suction jet pump, wherein the suction jet pump comprises a motive-fluid inlet, a suction inlet, as well is a pump outlet. The motive-fluid inlet of the suction jet pump is fluidically connected to the pressure area of the channel system via a suction jet branch-off point so that the suction jet pump is propelled by the system conveying device of the air-conditioning system. Furthermore, the suction inlet of the suction jet pump is fluidically connected to the sensor outlet of the sensor device so that, with the aid of the suction jet pump, air from the sensor device is sucked up and the air is thereby conveyed through the sensor device.

The air-conditioning system preferably comprises at least one heat exchanger, which air flows through during operation. The at least one heat exchanger is arranged in the channel system upstream to a system outlet, via which air is let into the vehicle interior, wherein the at least one heat exchanger allows for the air-conditioning and thereby the change of temperature of the air and/or the humidity within the air during operation.

The suction jet pump can comprise a nozzle in communication with the motive-fluid inlet, in particular a de Laval nozzle, hereinafter referred to in the following as a propelling nozzle, which flows into a mixing chamber of the suction jet pump, into which the suction inlet leads to and with which the suction inlet communicates.

In the case of preferred embodiments, the pump outlet of the suction jet pump is fluidically connected to the channel system via a suction jet flow-in opening. That means that air conveyed from the system conveying device of the air-conditioning system via the suction jet branch-off point is pumped into the suction jet pump and air is pumped out of the suction jet pump via the suction jet flow-in opening with the aid of the system conveying device. By means of this, the suction jet pump is fully propelled by the system conveying device. By means of this, overall, the air-conditioning system can be operated in a more efficient and/or space-saving and/or simplified manner. In general, the suction jet flow-in opening can be arranged downstream from the suction jet branch-off point within the channel system. It is also conceivable that the suction jet flow-in opening is arranged within the suction area. In particular, the suction jet flow-in opening can be arranged upstream to the suction jet branch-off point, in particular, within the suction area.

It is favourable if the suction jet branch-off point is arranged downstream from the system filter device. Thereby, the suction jet pump is propelled by the air that has already been filtered so that dirtying of the suction jet pump, which could lead to a reduction in performance of the suction jet pump and/or a reduced service life, is at least reduced.

The sensor device can also comprise at least one, meaning also two or a plurality of such analysis channels, which are fluidically connected to at least one such sensor outlet. Thereby, at least one of these sensor outlets can be fluidically connected to the suction inlet of the suction jet pump.

The sensor device favourably comprises at least one such sensor inlet, which is at least fluidically connected to such an analysis channel. Air from any section or area of the air-conditioning system, in particular, of the channel system or from the motor vehicle interior can be supplied to the respective sensor inlet and thereby, to the respective analysis channel in order to measure the characteristic of the air from this area.

In principle, the suction jet pump can be used to propel any airflow through the sensor device.

Embodiments where the sensor outlet of the sensor device connected to the suction inlet is fluidically connected to the analysis channel of the sensor device are conceivable. By means of this, air is sucked out of the analysis channel with the aid of the suction jet pump, thereby being propelled.

It is conceivable to provide at least one such analysis channel with an interaction section, in which the measurement of at least one characteristic of the air occurs.

The sensor device preferably uses electromagnetic waves to measure the at least one characteristic of the air. This allows for a simple and precise determination of the at least one characteristic of the air. For this purpose, the sensor device preferably comprises a generation device to generate the electromagnetic waves, which pass through and, in particular, penetrate the at least one analysis channel to measure the at least one characteristic, thereby interacting with the air flowing through the analysis channel. The generation device can principally generate electromagnetic waves of any kind, meaning in particular, any wavelength and/or period. In particular, the generation device can generate and emit pulsed electromagnetic waves. In addition, the generation device can also generate and emit monochromatic electromagnetic waves.

The sensor device furthermore comprises at least one detector, which detects the electromagnetic waves after passing through the analysis channel and interacting with the air in order to determine the at least one characteristic of the air.

In order to improve the precision of the measured characteristic of the air, the interaction section is preferably designed in such a way that the interaction of the electromagnetic waves with the analysis channel is avoided within it or at least reduced. For this purpose, it is conceivable to manufacture the analysis channel within the interaction section out of a correspondingly transparent material, for example, glass, plastic or the like.

Preferably, the interaction section is designed as a break in the analysis channel. That means that, when penetrating through the interaction section, the deflected electromagnetic waves do not interact with the analysis channel, in particular, with a channel sheath limiting a flow path through the analysis channel, in which the break is designed. This results in a precise measurement of the at least one characteristic of the air flowing through the analysis channel.

Thereby, the break can be designed to be closed on all sides so that the analysis channel is fully interrupted within the interaction section. It is also conceivable to design the analysis system as a breakthrough of the analysis channel, through which the deflected electromagnetic waves penetrate on the input and output sides.

The air-conditioning system, in particular the sensor device, is preferably designed in such a way that the break in the analysis channel to form the interaction section does not result in any or at least a reduced escape of the air flowing through the analysis channel from the analysis channel or the interaction section. The prevention or reduction of the escape of air flowing through the analysis channel out of the analysis channel or the interaction section thereby particularly prevents or reduces dirtying of the sensor device, in particular, of the respective detector and/or the generation device, caused by the air flowing through the analysis channel.

For this purpose, the analysis channel favourably comprises a nozzle orientated through the analysis channel up until the break, hereinafter also referred to as the channel nozzle, which leads and/or bundles the air flowing through the analysis channel within the area of the interaction section in such a way that the air flows through the analysis channel again after flowing through the interaction section and/or the least amount of air possible escapes from the analysis channel.

In addition or as an alternative, the interaction section can be surrounded by a flow path of a sheath air in such a way that the escape of the air flowing through the interaction section from the analysis channel or the interaction section is at least reduced. For this purpose, the flow of the sheath air through the said flow path, hereinafter also referred to as sheath air flow path, can occur with an increased pressure and/or an increased velocity in comparison to the flow of the air, the characteristic of which is to be determined and which flows through the analysis channel.

The sheath air preferably results in no or at least reduced levels of interaction with the deflected electromagnetic waves that penetrate through the interaction section, which influence the measurement of the at least one characteristic of the air flowing through the analysis channel. For this purpose, the sheath air is different from the air flowing through the analysis channel, thereby particularly being fresh air or cleaned air. For this purpose, the sheath air can be filtered upstream to the interaction section, in particular, using a separate filter device or a sheath air filter. In order to filter the sheath air, a filter device that is already available, in particular, the system filter device, can be used.

The sheath-air flow path can be implemented by means of a sheath-air channel surrounding the analysis channel, in particular, within the area of the interaction section, wherein the sheath-air channel within the area surrounding the interaction section can comprise a break in such a way that a penetration of the deflected electromagnetic waves takes place without interaction with the sheath-air channel.

It is conceivable to guide the sheath-air flow path and the sheath-air channel and the analysis channel in the sensor device together downstream from the interaction section. In particular, that means that the air and the sheath air flowing through the analysis channel are mixed downstream from the interaction section and are led into a joint channel, which corresponds to the analysis channel and the sheath air channel. This simplifies the construction of the sensor device. Furthermore, thereby, the prevention of air flowing through the analysis channel escaping from the interaction section into the sensor housing can take place in a more effective manner.

This the sheath-air channel can be connected to such a sensor outlet, which is fluidically connected to the suction inlet in order to thereby convey the sheath air through the sensor device with the aid of the suction jet pump. It is also conceivable to fluidically connect the sheath-air channel and the related analysis channel to the suction inlet of the suction jet pump, in particular, via such a joint sensor outlet, thereby conveying both the air, as well as the sheath air through the analysis channel.

The sensor device favourably comprises a housing, in which the at least one analysis channel is arranged. In addition, the generation device and/or the at least one detector and/or the sheath-air channel is also preferably arranged within the housing, hereinafter also referred to as the sensor housing. Thereby, the suction jet pump is arranged outside of this housing, thereby being outside of the sensor device. Thereby, the sensor device can be manufactured in a compact manner as mentioned above. As a consequence, the sensor device is arranged in a space-saving manner and/or is provided even in the case of a small assembly space. As a consequence, the air-conditioning system can also be designed in an assembly-space-saving manner and/or be operated more efficiently.

The sensor device can be flushed with flushing-air in order to flush and clean the sensor housing and the components arranged within it. In particular, this is of an advantage if dirtied air flowing through such an analysis channel flows out of the analysis channel and into the sensor housing. For this purpose, the sensor device preferably comprises such a sensor inlet, hereinafter also referred to as the flushing-air inlet, in order to introduce flushing-air into the sensor housing and into a corresponding sensor outlet of this type, hereinafter also referred to in the following as a flushing-air outlet, to release the flushing-air. The flushing-air inlet and the flushing-air outlet are favourably fluidically separated from the sensor inlet and/or sensor outlet belonging to the respective analysis channel, in particular being separated, wherein it can be provided that the flushing-air outlet is fluidically connected to the suction inlet of the suction jet pump. As a result, the suction jet pump sucks the flushing-air through the sensor housing, thereby flushing this.

The air-conditioning system preferably comprises a filter device arranged within the channel system to filter air. The filter device comprises at least one filter material, which air flows through during operation of the air-conditioning system, thereby filtering the air. The filter material can be an integral part of a filter element, which is, in particular, replaceable and can serve to filter the particulate matter. It is preferred if a system outlet of the air-conditioning system to release air into the motor vehicle interior is arranged downstream from the filter device so that the air supplied to the motor vehicle interior is previously filtered.

It is to be understood that, into addition to the air-conditioning system, a motor vehicle with such an air-conditioning system is part of the scope of this invention.

Other important features and advantages of the invention result from the subclaims, the drawings and the related figure description based on the drawings.

It is to be understood that the features explained in the aforementioned and in the following cannot only be used in the respectively indicated combination, but also in other combinations or alone, without departing from the scope of the present invention.

Preferred exemplary embodiments of the invention are represented in the drawings and will be described in more detail in the following description, wherein the same reference numbers will refer to the same or similar or functionally identical components.

The system conveying device can comprise an impeller to convey the air. The impeller can be arranged within a spiral-shaped spiral housing of the channel system. The spiral housing, hereinafter also referred to in the following as a spiral channel, limits a flow path of the air and comprises a flow cross-section that enlarges, in particular, in a continuous manner. The spiral housing or the spiral channel comprises a start section and an end section, between which the flow cross-section enlarges, in particular, in a continuous manner. Due to the spiral-shaped design of the spiral channel, thereby, a hollow space that is separated from the channel system is formed on the outside of the spiral channel between the start section and the end section. In the end section, the spiral channel passes into a connection section of the channel system. The end section can comprise a tongue facing the start section and the impeller, which preferably adjoins the set hollow space. Thereby, the tongue can run particularly tangential to the impeller.

It is preferred if the sensor device is arranged in the said hollow space. The arrangement of the sensor device within the hollow space allows for a particularly compact construction of the air-conditioning system. In addition, the sensor device can be supplied with air in a simple manner so that the manufacture and assembly, as well as the operation of the air-conditioning system are simplified.

Favourably, the suction jet pump is arranged and/or designed within the area of the spiral channel, preferably in the area of the end section, more preferably in the area of the tongue. By means of this, the compact construction of the air-conditioning system can be further improved and/or the manufacture and/or the operation can be further simplified.

The suction jet pump can extend through the spiral channel. That means that the motive-fluid inlet and the pump outlet of the suction jet pump can be fluidically connected to the various areas of the spiral channel. This permits for a particularly compact and simple implementation of the suction jet pump. In addition, thereby, the fluidic connection of the suction input with the sensor outlet can be implemented in a compact and simplified manner.

Embodiments where the suction jet branch-off point is arranged within the spiral channel, particularly preferred in the end section, more preferably in the tongue have proven to be favourable. Such an arrangement results in a particularly simple and compact design of the suction jet pump and thereby, the air-conditioning system. Thereby, the suction jet flow-in opening can be arranged downstream from the suction jet branch-off point within the channel system. The suction jet flow-in opening can be arranged within the spiral channel, preferably within the end section, more preferably in the area of the tongue. Thereby, the suction jet pump can be implemented in a particularly easy and compact manner.

Favourably, a cooling channel is designed and/or arranged on the outside of the spiral channel, particularly between the start section and the end section of the spiral channel. Favourably, the cooling channel is arranged adjacent to the hollow space, in particular, adjoining it, in which the sensor device is arranged. With the aid of the cooling channel, air is supplied to a drive device of the system conveying device, meaning, for example, a drive motor and the drive device is thereby cooled. For this purpose, air is branched off from the channel system downstream from the system filter device and supplied to the drive device. Thereby, it is preferred to fluidically connect the sensor device to the cooling channel. Thereby, filtered air can be supplied to the sensor device via the system filter device. This air can be supplied to such an analysis channel. In addition or as an alternative, it is possible to use this air as sheath air or to flush the sensor device.

Variants where the suction jet branch-off point is arranged within the cooling channel are also conceivable. This has the advantage that the cooling channel is arranged within the proximity of the sensor device arranged within the set hollow space so that the suction jet pump can be constructed in a compact manner. In addition, by means of this, undesired pressure losses and thereby, reductions in performance of the suction jet pump are at least reduced. Furthermore, the suction jet pump is propelled by cleaned air. Furthermore, it is favourable if the system filter device is arranged in the pressure area of the channel system so that the cooling channel and, as a result, also the motive-fluid inlet is provided with air with a high pressure.

Variants have also proven to be favourable where the suction jet flow-in opening is arranged within the area of the tongue, preferably on the side of the tongue facing the impeller, in particular being designed within the tongue. Thereby, the surprising knowledge is used that, during operation, a locally limited pronounced vacuum is predominant within this area. As a result, this vacuum is used in order to strengthen a drive of the suction jet pump and increase the efficiency and performance of the suction jet pump. In addition, the suction jet pump can be implemented in a compact manner due to the proximity to the sensor device.

In the case of a favourable embodiment, the suction jet pump comprises an outlet section extending between the motive-fluid inlet and the pump outlet. The outlet section can, in particular, fluidically communicate with the mixing chamber of the suction jet pump or contain this. In particular, it is conceivable to design the outlet section of the suction jet pump like a diffuser.

Preferably, the outlet section extends through the end section of the spiral channel, in particular, penetrating through the tongue. By means of this, the suction jet pump can be implemented in a compacter and more efficient manner. Thereby, it is favourable if the pump outlet of the suction jet pump is arranged within the channel system in such a way, in particular, within the spiral channel so that air flows from the pump outlet in the direction of the air flow within the area of the channel system, in which the pump outlet is arranged. In particular, this is implemented by the outlet section comprising an end area containing the pump outlet, which runs along the flow direction of the air in the channel system, in particular, parallel to it.

It is particularly preferred if the pump outlet, in particular, the end area of the outlet section containing the pump outlet is designed as a type of nozzle, thereby being tapered into the flow direction of the air through the outlet section.

DETAILED DESCRIPTION

Figure 1:
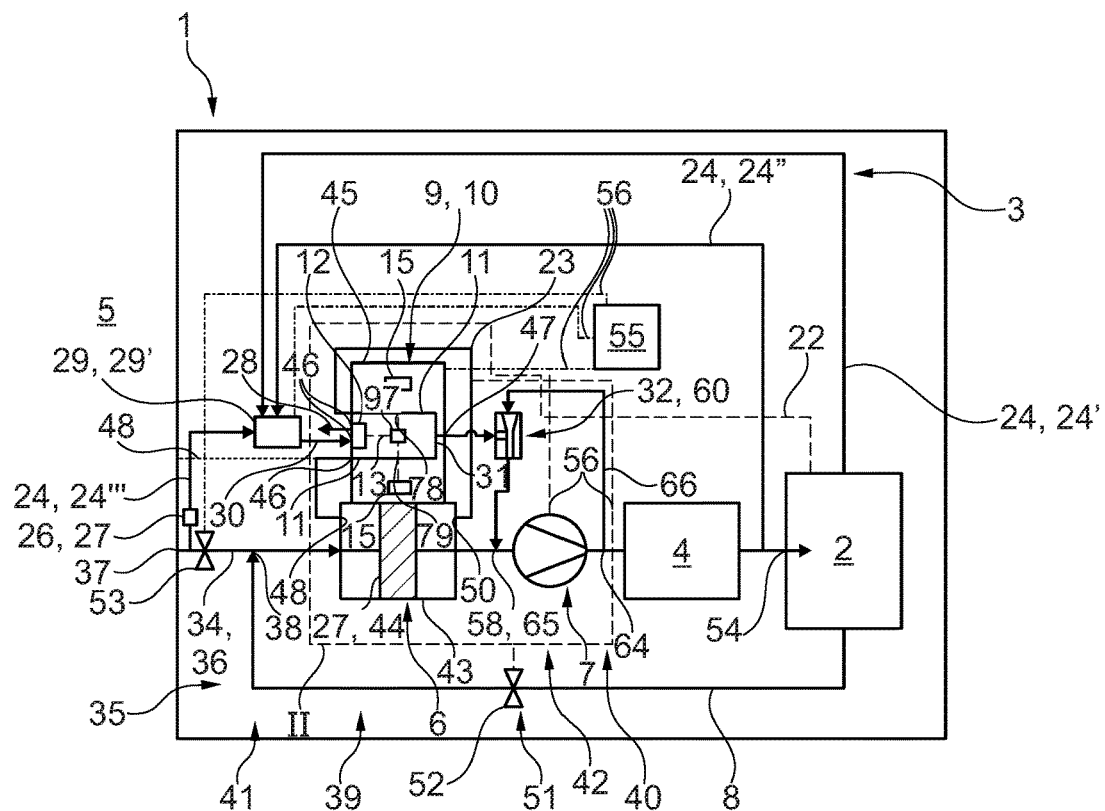
FIG. 1 shows a strongly simplified, schematic like representation of an air-conditioning system with a suction jet pump within a motor vehicle.

An air-conditioning system 3, as is shown, for example, in FIG. 1, is, in particular, an integral part of a motor vehicle 1, which comprises a motor vehicle interior 2 for passengers (not shown). The air-conditioning system 3 supplies air to the vehicle interior 2 to air-condition the vehicle interior 2 and comprises a channel system 35 air flows through during operation. The air-conditioning system 3 comprises at least one heat exchanger 4 arranged in the channel system 35 to air-condition air, wherein that at least one heat exchanger 4 allows for the temperature control of the air and/or the change in humidity in the air. Furthermore, the air-conditioning system 3 comprises a filter device 6 in the channel system 35, hereinafter also referred to as a system filter device 6, to filter the air supplied to the interior 2 as well as a conveying device 7, hereinafter also referred to as a system conveying device 7 to convey air through the air-conditioning system 3. In the example shown, the heat exchanger 4 is arranged downstream from the conveying device 7 and the filter device 6 is arranged upstream to the conveying device 7. The channel system 35 comprises an outside-air channel 36, with which outside air, meaning from the ambient environment 5 of the air-conditioning system 3 or the motor vehicle 1, enters into the air-conditioning system 3. In the example, the outside-air channel 36 extends from a system inlet 37 connected to the ambient environment 5 up to a system outlet 54, which is fluidically connected to the motor vehicle interior 2, in particular, connected to the motor vehicle interior 2 and via which, air is discharged into the motor vehicle interior 2. Within the outside-air channel 36, which is hereinafter referred to in the following as a main channel 34, the filter device 6, the conveying device 7 and the at least one heat exchanger 4 are arranged. The channel system 35 additionally comprises a circulating-air channel 8, which serves to recirculate air from the motor vehicle interior 2 or inside air. The circulating-air channel 8 is fluidically connected to the vehicle interior 2 and the system outlet 54, wherein the circulating-air channel 8 in the example shown branches off from the vehicle interior 2 and flows into the main channel 34 at a circulating-air flow-in opening 38 upstream to the filter device 36 and downstream from the system inlet 37.

The air-conditioning system 3 additionally comprises a sensor device 9, which measures at least one characteristic of air. The at least one characteristic of the air measured by means of the sensor device 9 is preferably a characteristic corresponding to the quality of the air or at least correlating with it. In particular, the at least one characteristic can be a particle concentration, in particular, fine-dust particle concentration, the concentration of nitrogen oxides and/or carbon oxides and/or oxygen and the like. The sensor device 9 is, in particular, a fine-dust particle sensor 10 to measures the fine-dust particle content in the air or preferably comprises such a fin-dust particle sensor 10. The sensor device 9 comprises at least one analysis channel 11 and a generation device 12 which air can flow through. The channel system 35 comprises at least one supply channel 21, 22, 23 to supply air to the at least one analysis channel 11. Using the generation device 12, electromagnetic waves 13, in particular, monochromatic electromagnetic waves 13, for example, monochromatic light, are generated, which pass through the analysis channel 11 in an interaction section 79, in particular penetrating it. Thereby, within the interaction section 79 of the analysis channel 11, it results in an interaction of the electromagnetic waves 13 with the air flowing through the analysis channel 11, which is hereinafter also referred to as air to be analysed, wherein the interaction makes the measurement of the at least one characteristic of the air to be analysed possible. For this purpose, the sensor device 9 comprises a detector 15, which detects the electromagnetic waves 13 after passing through the analysis channel 11 and the interaction with the air. Thereby, in the case of the sensor device 9 designed as a fine-dust particle sensor 10 or comprises such a one, the concentration of the fine dust in the air to be analysed is measured and determined. Thereby, the generation device 12 comprises a source 16 to generate the electromagnetic waves 13 and a controller 17 to control the source 16. In the example shown, the source 16 is designed as a laser 18, which is controlled by means of the controller 17.

For the temperature control of the generation device 12, in particular, of the source 16 and/or the controller 17, a temperature-control channel 24 is provided that is different from the main channel 6 or the at least one supply channel 21, 22, 23 leading to the analysis channel 11, which supplies air-conditioned air to the sensor temperature-control space 19 and thereby applies air-conditioned air to the generation device 12 for the purpose of temperature control of the generation device 12. Thereby, the air-conditioned air can originate from the motor vehicle interior 2 of the vehicle 1. For this purpose, such a temperature-control channel 24', hereinafter also referred to in the following as a first temperature-control channel 24', leads air from the vehicle interior 2 to the sensor temperature-control space 19. Thereby, it results in a heat exchange between the generation device 12 and the air-conditioned air supplied to the sensor temperature-control space 19 so that it results in a temperature control of the generation device 12. In addition or as an alternative, air-conditioned air originating from the main channel 34 can be supplied to the sensor temperature-control space 19 downstream from the at least one heat exchanger 4 and upstream to the vehicle interior 2 and, thereby, it is applied to the generation device 12. For this purpose, such a temperature-control channel 24" is provided, which is hereinafter referred to in the following as a second temperature-control channel 24". The second temperature-control channel 24" branches off from the main channel 34 downstream from a heat exchanger 4 and upstream to the vehicle interior 2, in particular, from a mixing space (not shown) of the air-conditioning system 3 and flows into the sensor temperature-control space 19. In addition or as an alternative, it is conceivable to branch off air from the main channel 34 or the outside-air channel 36 with the aid of such a temperature channel 24''', also hereinafter referred to in the following as a third temperature-control channel 24''' upstream to the at least one heat exchanger 4 and upstream to the system filter device 6, thereby supplying outside air to the sensor temperature-control space 19 in order to control the temperature of the generation device 12, wherein, in this case, the outside air is cleaned or filtered beforehand. The air-conditioned air supplied to the sensor temperature-control space 19 of the purpose of controlling the temperature of the generation device 12 flows through the sensor temperature-control space 19 and exits the sensor temperature-control space 19 via a sensor outlet 47 and a sensor temperature-control outlet channel 28.

It is preferred if the air serving to control the temperature of the generation device 12 supplied to the sensor temperature-control space 19 is cleaned or filtered before applying it to the generation device 12, in particular, in order to avoid or reduce a dirtying of the source 16 or a wave outlet area (not shown) of the source 16. For this purpose, the system filter device 6 can be used. It is also conceivable, in particular, in the second temperature-control channel 24" and/or in the third temperature-control channel 24" to provide a filter device 6, also hereinafter referred to in the following as a sensor-temperature-control filter device 26, that is separated from the system filter device 26 in order to filter the air before it enters into the sensor temperature-control space 19. The respective sensor-temperature-control filter device 26 can comprise a fine-particle filter 27 or be designed as such. In the example shown, such a sensor-temperature-control filter device 26 is only provided in the third temperature-control channel 24", wherein it is also conceivable to provide such a sensor temperature-control filter device 26 in the first temperature-control channel 24'. In the example shown, the temperature-control channels 24 flow into a sensor-control valve device 29, in particular, into a multi-port valve 29', the respective outlet of which is fluidically connected to the sensor temperature-control space 19 via a sensor-temperature-control supply channel 30. With the sensor-temperature-control valve device 29, it is possible to optionally supply air from the respective temperature-control channel 24' to the sensor temperature-control space 19, thereby applying air to the generation device 12 for the purpose of controlling the temperature with air. Naturally, it is also possible to makes the air originating from at least two of the temperature-control channels 24 and supply them to the sensor temperature-control space 19. Thereby, such a sensor-temperature-control filter device 26 can be provided in the sensor-temperature-control supply channel 30 (not shown) in order to do without respectively separate such sensor-temperature-control filter devices 26 within the temperature-control channel 24.

Figure 2:
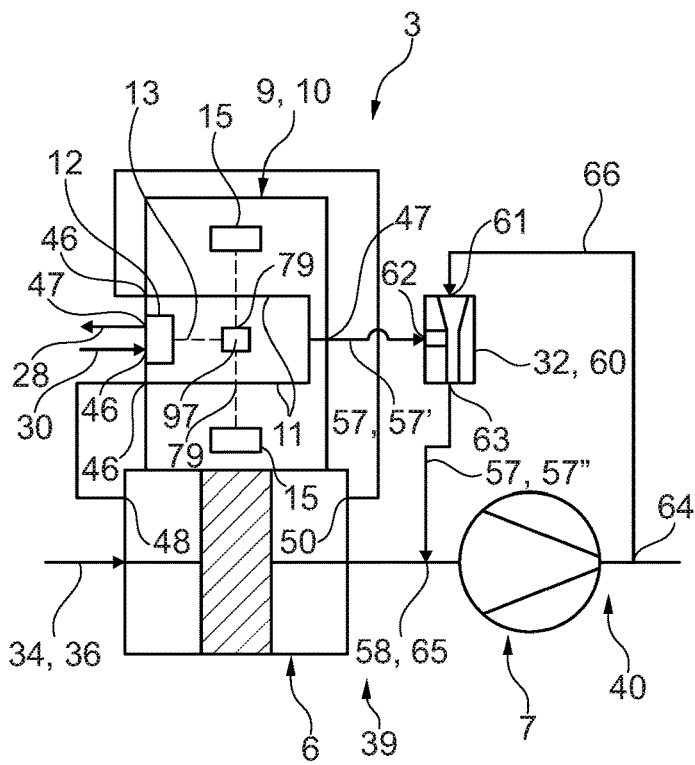
FIG. 2 shows an enlarged representation of the area in FIG. 1 indicated with II.
Figure 7:
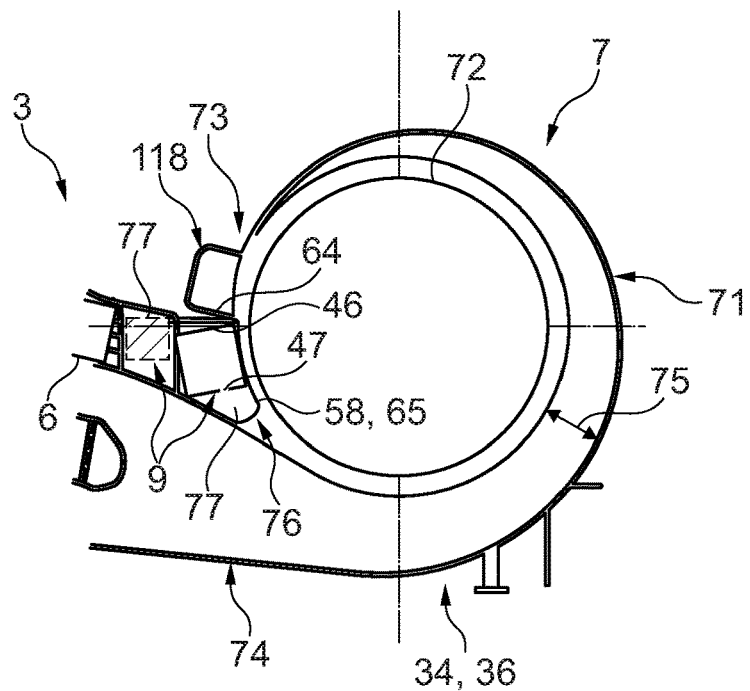
FIG. 7 shows the view from FIG. 4 in the case of another exemplary embodiment.

In the case of the example shown in FIGS. 1 and 2, the sensor device 9 comprises two such analysis channels 11 spaced away from each other, wherein the generation device 12 is arranged between the analysis channels 11, which primarily run in parallel. The generation device 12, in particular, the laser 18, is arranged in such a way that it emits the generated electromagnetic waves 13 between and along the analysis channels 11. The sensor device 9 comprises a deflection device 97, which supplies the electromagnetic waves 13 emitted from the generation device 12 to the interaction section 79 of at least the analysis channels 11 in such a way that the deflected electromagnetic waves 13 penetrate and pass through the interaction section 79, thereby interacting with the air flowing through the analysis channel 11. After interacting with the air, the deflected electromagnetic waves 13 are detected by a related detector 15 in order to measure at least one characteristic of the air, with which the electromagnetic waves 13 previously interacted. The deflection device 97 is designed in such a way that it deflects the electromagnetic waves 13 emitted from the generation device 12 toward the interaction section 79 of the respective analysis channel 11. That means that the deflection device 97 deflects the emitted electromagnetic waves 13 both in the direction of the interaction section 79 of the analysis channel 11 as well as in the direction of the interaction section 79 of the other analysis channel 11. For this purpose, the deflection device 97 can comprise an electromagnetic-wave-carrying 13 conductor 104, in particular, a glass fibre 105 (see FIG. 7), a mirror, a beam separator or a combination thereof (respectively not shown). Thereby, such a detector 15 is assigned to the respective analysis channel 11 so that, with the aid of the same generation device 12, at least one characteristic of the air flowing through the one analysis channel 11, and independently of this, of the air flowing through the other analysis channel 11 can be measured. The detector 15 assigned to the respective analysis channel 11 or the interaction section 79 is favourably arranged on the side of the interaction section 79 facing away from the entry side of the electromagnetic waves 13 into the related interaction section 79 and outside the interaction section 79. By means of this, the detection of the electromagnetic waves 13 deflected in the direction of the other interaction section 79 is prevented or at least reduced and/or an independent measurement of the at least one characteristic of the air flowing through the respective analysis channel 11 is made possible. The arrangement of the respective detector 15 outside of the interaction section 79 has the consequence that the dirtiness of the detector 15 is less or at least reduced by the air flowing though the respective analysis channel 11.

The system conveying device 7 divides the channel system 35 into an upstream-side suction area 39 and a downstream-side pressure area 40. That means that the conveying device 7 separates the suction area 39 arranged upstream to the conveying device 7 from the pressure area 40 arranged downstream from the conveying device 7. Additionally, the system conveying device 6 divides the channel system 35 into an upstream-side raw area 41 and a downstream-side pure area 42. The system filter device 6 comprises a housing 43, hereinafter also referred to in the following as filter housing 43, in which a filter material 44 is arranged to filter air, which can be a fine-dust particle filter 27 or part of such a filter. Thereby, air passing through the filter material 44 is cleaned so that the separation of the channel system 35 into the raw area 41 and the clean area 42 takes place with the aid of filter material 44.

The sensor device 9 comprises a housing 45, hereinafter referred to in the following as a sensor housing 45, in which the at least one analysis channel 11 is arranged. In the example shown, additionally, the generation device 12 as well as the detectors 15 are arranged within the sensor housing 45. The sensor device 9 additionally comprises a sensor inlet 46, through which air is let into the sensor device 9, in particular, into at least one analysis channel 11. Thereby, the sensor device 9 shown in FIG. 1, 2 respectively comprises two such sensor inlets 46, which are each fluidically connected to such an analysis channel 11. In addition, such a sensor inlet 46 is fluidically connected to the sensor temperature supply channel 30 in order to let air into the sensor temperature-control space 19. The sensor device 9 additionally comprises at least one sensor 47 to let out air from the sensor device 9, wherein, in the examples shown, such a sensor outlet 47 is provided to let out air flowing through the at least one analysis channel 11 and such a sensor outlet 47 is provided to let out air from the sensor temperature-control space 19, which is fluidically connected to a sensor-temperature-control outlet channel 28. The air flowing out of the respective sensor outlet 47 can principally be supplied to the ambient environment 5, as this is, for example, shown for the air flowing into the sensor temperature-control outlet channel 28. The air flowing from respective sensor outlet 47 can also be supplied to the channel system 35, as is shown, for example, for the sensor outlet 47 fluidically connected to the at least one analysis channel 11. For this purpose, a sensor return channel 57 is provided, which is fluidically connected to this sensor outlet 47 and flows into the main channel 34, for example, via a sensor flow-in opening 58, wherein, in the examples shown, the sensor flow-in opening 58 is arranged between the system filter device 6 and the system conveying device 7. It is also conceivable to arrange the sensor flow-in opening 58 upstream to the sensor filter device 6 and to arrange it in the raw area 41 in order to filter the fed-back air with the system filter device 6.

The sensor housing 45 is arranged on the filter housing 43. This allows the sensor device 9 to be supplied with air, in particular, air to be analysed easily or/or with a reduced amount of fluidic connections.

In the examples shown, in the raw area 41, a raw branch-off point 48 is arranged, which is fluidically connected to such a sensor inlet 46 to let air in from the raw area 41, meaning before the air has passed through the filter material 44, into the sensor device 9 in order to provided one of the analysis channels 11 with air and measure at least one characteristic. For this purpose, a sensor-raw air supply channel 21 is provided, which runs from the raw branch-off point 48 to such a sensor inlet 46. The raw branch-off point 48 is preferably arranged downstream from the circulating-air flow-in opening 38. In addition or as alternative, as shown with the dashes, a sensor inlet channel 49 can be provided to let in air from the ambient environment 5 or the outside air into the sensor device 9, in particular, in to such an analysis channel, wherein the sensor inlet channel 49 is separate from the outside-air channel 36 or the main channel 34. If such a sensor inlet channel 49 is provided, it is conceivable to arrange a valve (not shown) within the sensor inlet channel 49 and/or within the sensor raw-air supply channel 21 so that air can be supplied to the sensor device 9 using this valve via the raw branch-off point 48 or directly from the ambient environment 5.

In addition, a clean branch-off point 50 is arranged in the clean area 42 of the channel system 35, is fluidically connected to such a sensor inlet 46 to let in air from the clean area 42, meaning after the air has passed through the filter material 44, into the sensor device 9 in order to provide one of the analysis channels 11 with air and measure at least one characteristic of air. The fluidic connection takes place by means of a sensor clean air supply channel 23, which runs from the clean branch-off point 50 to the related sensor inlet 46. Thereby, the clean branch-off point 50 is arranged upstream to the conveying device 7, wherein an arrangement is also possible downstream from the conveying device 7 and upstream to the at least one heat exchanger 4. In the case of the exemplary embodiment shown, the raw branch-off point 48 and the clean branch-off point 50 are arranged on the filter housing 43 and thereby directly arranged on the system filter device 6, in particular, designed within the filter housing 43. By means of this, air can be supplied to the sensor device 9 in a simpler manner and with reduced assembly-space requirements.

The air-conditioning system 3 comprises a shutoff device 51, which comprises a circulating-air shutoff valve 52, in particular provided within the circulating-air channel 8 and an outside-air shutoff valve 53 arranged within the outside-air channel 36 or the main channel 34. Thereby, the circulating-air flow-in opening 38 is arranged downstream to the outside-air shutoff valve 53. The shutoff device 51 can be adjusted between a circulating-air position and an outside-air position, wherein, in the circulating-air position, the outside-air shutoff valve 53 shuts off the outside-air channel 36 or the main channel 34 and the circulating-air shutoff valve 52 releases the circulating-air channel 8 so that no air enters from the ambient environment 5 and, thereby, no outside air enters into the air-conditioning system 3, whereas air from the vehicle interior 2 and thereby, interior air, is sucked with the aid of the conveying device 7 from the motor vehicle interior 2 and is fed back via the system outlet 54 to the vehicle interior 2, thereby being recirculated. Thereby, the air originating from the vehicle interior 2 within the air-conditioning system 3 passes into the filter device 6 as well as the at least one heat exchanger 4 due to the arrangement of the circulating-air flow-in opening 38. In the outside-air position, in contrast, the circulating-air channel 8 is closed with the aid of the circulating-air shutoff valve 52 while the outside-air shutoff valve 53 releases the outside-air channel 36. Thereby, a flow of air through the circulating-air channel 8 is hindered, whereby air from the ambient environment 5 and thereby outside air enters into the air-conditioning system 3. In this way, via the raw branch-off point 48, in the air-circulation position, air can flow from the motor vehicle interior 2 and, in the outside-air position, air can flow from the ambient environment 5 or the outside air so that, via the raw branch-off point 48, both inside air as well as outside air can be analysed as air to be analysed using the sensor device 9, in particular one characteristic of the air to be analysed can be measured. The system conveying device 7 is arranged between the circulating-air shutoff valve 52 and the outside-air shutoff valve 53. In this way, using this system conveying device 7, it is possible to convey air from the ambient environment 5 in the outside-air position and to convey air from the vehicle interior 2 in the circulating-air position and to supply it to the system outlet 54. Naturally, by means of this, it is also possible to convey both air from the vehicle interior 2 as well as air from the ambient environment 5 in intermediate positions and to supply it to the system outlet 54.

As an alternative or in addition, the channel system 35 can comprise a sensor inside air supply channel 22, which is shown with the dashes, which directly supplies air from the vehicle interior 2 to the sensor device 9 or such an analysis channel 11.

The air-conditioning system 3 additionally comprises a control device 55, which can also be an integral part of the motor vehicle 1. The control device 55 is connected via communication connections 56 to the sensor device 9, the shutoff device 51 and, thereby, with the shutoff valves 52, 53, with the system conveying device 7 as well as with the sensor-temperature-control valve device 29 on a communicative level in such a way that the control device 55 can control/or query these respectively. In addition, the control device 55 can be connected to the controller 17 of the generation device 12 in a communicative manner in order to control and/or query this.

In particular, the control device 55 is designed in such a way that it operates the air-conditioning system 3 in outside-air mode if the quality of the outside air exceeds a specified value, in particular, if it is better than the quality of air from the vehicle interior 2, whereas it operates the air-conditioning system 3 in an circulating-air mode if the quality of the outside air sinks below a specified value and/or the quality of the air within the vehicle interior 2 is better than the quality of the outside air. For this purpose, the control device 55 adjusts the shutoff device 51 into the circulation position in the circulating-air mode and into the outside-air position in the outside-air mode. Naturally, positions between the air-circulation position and the outside-air position are also possible like operating the air-conditioning system 3 between the circulating-air mode and outside-air mode.

The air-conditioning system 3 as a conveying device 32 that is separate from the system conveying device 7 to convey air through the sensor device 9, hereinafter also referred to in the following as a sensor conveying device 32. The sensor conveying device 32 is designed as a suction jet pump 60, which comprises a motive-fluid inlet 61, a suction inlet 62, as well as a pump outlet 63. The motive-fluid inlet 61 is fluidically connected to the pressure area 40 via a suction jet branch-off point 64 within the channel system 35 present in the main channel 34 so that air flows from the pressure area 40 into the suction jet pump 60 drive the suction jet pump 60 by means of the motive-fluid inlet 61. In addition, the suction and 62 is fluidically connected to such a sensor outlet 47, wherein, in the example shown in FIG. 1, the suction inlet 62 is fluidically connected to the sensor outlet 47, which is fluidically connected to the analysis channels 11 via the sensor discharge channel 31 in such a way that the suction jet pump 60 sucks the air flowing through the analysis channels 11 out of the sensor device 9, thereby conveying it. In this example, the said sensor outlet 47 with a first section 57' of the sensor feedback channel 57 is connected to the suction inlet 62, while a second section 57" of the sensor feedback channel 57 is connected to the pump outlet 63 and is connected to the channel system 35, in particular, to the main channel 34, via the sensor flow-in opening 58 (c.f. FIG. 2) so that the air flowing out of the pump outlet 63, which consists of the air flowing through the motive-fluid inlet 61 and the suction inlet 62, flows back via the sensor flow-in opening 58, which is simultaneously a suction jet flow-in opening 65. The fluidic connection between the motive-fluid inlet 61 and the suction jet branch-off point 64 takes place via a motive-fluid supply channel 66, which extends from the suction jet branch-off point 64 to the motive-fluid inlet 61. In the example shown, additionally, the suction jet flow-in opening 65 and the sensor flow-in opening 58 is arranged upstream to the suction jet branch-off point 64 and the system conveying device 7 and within the suction area 39 accordingly. The suction jet pump 60 is driven by the system conveying device 7 and conveys air through the sensor device 9 in a known way, wherein, in the example shown in FIG. 1, the air flowing through the analysis channels 11 to be analysed is conveyed with the aid of the suction jet pump 60. It is also conceivable to fluidically connect the sensor outlet 47, which is connected to the sensor temperature-control outlet channel 28, to the suction inlet 62 of the jet pump 60 in order to convey the air used to control the temperature of the generation device 12 with the aid of the suction jet pump 60.

Figure 3:
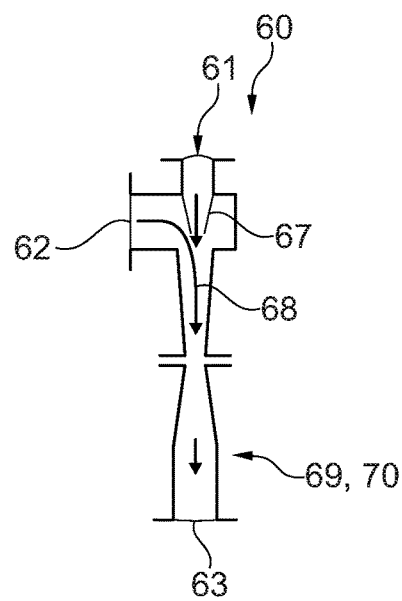
FIG. 3 shows a cross-section though the suction jet pump.

FIG. 3 shows a section through such a suction jet pump 60. The suction jet pump 60 comprises a motive nozzle 67, which is fluidically connected to the motive-fluid inlet 61, and flows into a mixing chamber 68 of the suction jet pump 60, hereinafter referred to as a suction jet mixing chamber 68. The suction inlet 62 is fluidically connected to the mixing chamber 68 in such a way that air flowing through the motive nozzle 67 into the mixing chamber 68 sucks air flowing through the suction inlet 62. An outlet section 69 of the suction jet pump 60, which is designed as a diffuser 70, extends between the motive-fluid inlet 61 and the pump outlet 63, in particular between the mixing chamber 68 in the pump outlet 63. This allows for improved suction of the air to occur through the suction inlet 62 and thereby, an increased efficiency of the suction jet pump 60.

Figure 4:
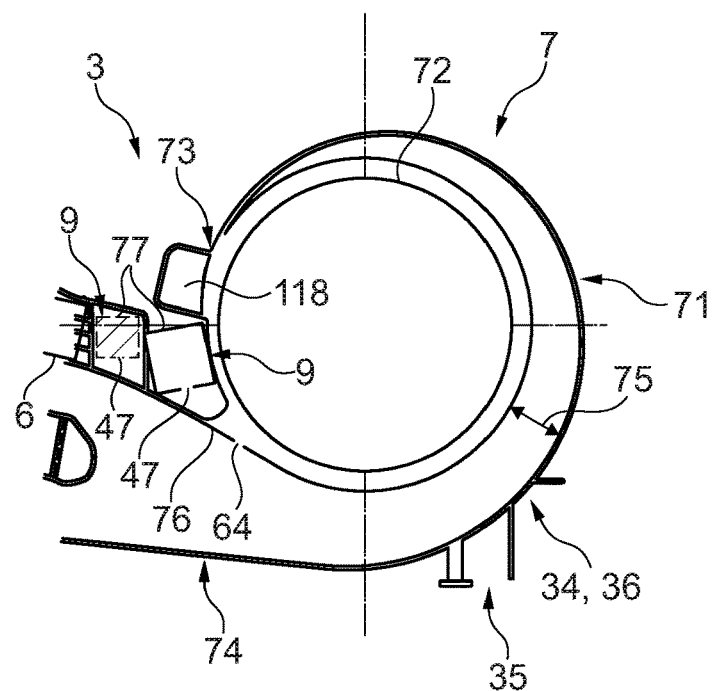
FIG. 4 shows a cross-section through the air-conditioning system within the range of a system conveying device.

FIG. 4 shows a cross-section through the air-conditioning system 3 in the area of the system conveying device 7. In the case of this exemplary embodiment, the system conveying device 7 comprises a spiral-shaped spiral channel 71 of the channel system 35, in particular, of the outside-air channel 36 or of the main channel 34. An impeller 72 of the system conveying device 7 is arranged in the spiral channel 71, which is driven by a drive device (not shown) of the system conveying device 7 and rotates to convey the air. That the spiral channel 71 comprises a start section 73 and an end section 74 in the flow direction, between which a flow cross-section 75 of the spiral channel 71 enlarges, particularly in a continuous manner. The end section 74 comprises a tongue 76 facing the impeller 72 and running primarily tangentially to the impeller 72. On the outside, between the start section 73 and the end section 74 of the spiral channel 71, a hollow space 77 is formed that is separated from the channel system 35, wherein the sensor device 9 is favourably arranged within this hollow space 77. In the case of the example shown in FIG. 4, two such hollow spaces 77 result, wherein the sensor device 9 is optionally arranged within the hollow spaces 77. In particular, the sensor device 9 is arranged within the said hollow space 77, which abuts the system filtered device 6, w the sensor device 9, which is arranged within this hollow space 77, is shown in FIG. 4 as shaded. The arrangement of the sensor device 9 within such a hollow space 77 leads to a very assembly-space-saving and simple construction of the air-conditioning system 3. In particular, supplying and discharging air to and from the sensor device 9 are made possible in a simple fight manner. In additionally, a cooling channel 118 is shown, which supplies air to the drive device (not shown) of the system conveying device 7 for the purpose of cooling. Thereby, the cooling channel 118 is connected to the channel system 35 downstream from the system filtered device 6 (see FIG. 6) and thereby branches cleaned air from the system filtered device 6 and leave this to the drive device. Thereby, it is conceivable to supply air from the cooling channel 118 to the sensor device 9, thereby supplying cleaned air from the system filtered device 6 in order to analyse this cleaned air and/or in order to clean or to flush the sensor device 9. For this purpose such a sensor inlet 46 can be fluidically connected to the cooling channel 118 (not shown).

The suction jet branch-off point 64 is arranged in the end sections 74, in particular, within the tongue 76, more preferably being designed in this manner. Thereby, the branching of air to propel the suction jet pump 60 can take place in a simplified and compact manner, in particular in direct proximity to the sensor device 9. Thereby, it is preferred if the sensor outlet 47 of the sensor device 9, which is fluidically connected to the suction inlet 62 of the suction jet pump 60, is arranged on the side of the sensor device 9, which, in particular, is adjacent to the end section 74, in particular the tongue 76, in particular, facing it.

Figure 5:
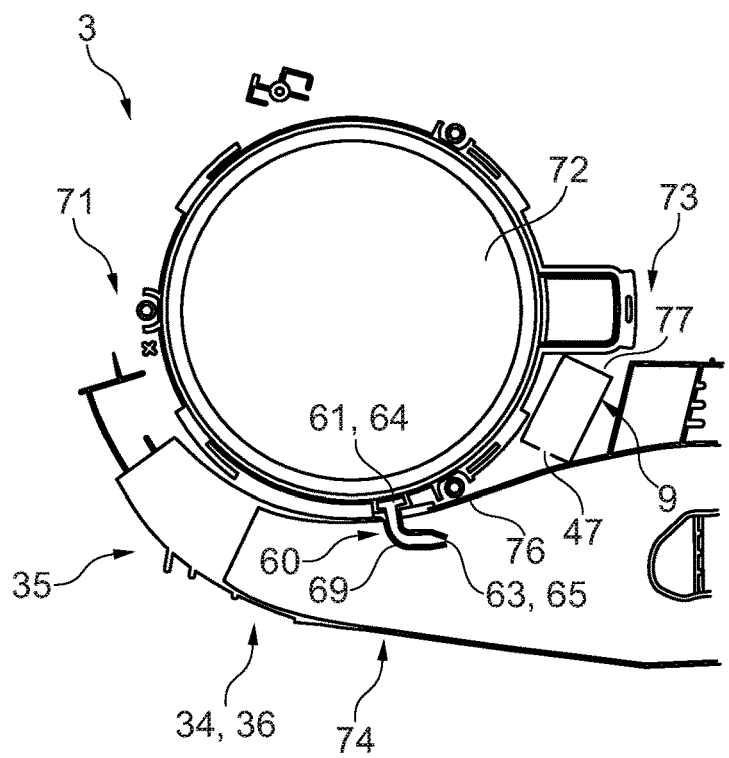
FIG. 5 shows a cross-section through the air-conditioning system within the range of a system conveying device in the case of another exemplary embodiment.

FIG. 5 shows another exemplary embodiment of the air-conditioning system 3, which, in particular, differs from the exemplary embodiment shown in FIG. 4 in the fact that the outlet section 69 of the suction jet pump 60 extends through the tongue 76 of the end section 74 of the spiral channel 71. Thereby, the motive-fluid inlet 61 is arranged on the side of the tongue 76 facing the impeller 72 in the spiral channel 71 and the pump outlet 63 is arranged on the side of the tongue 76 facing away impeller 72 within the end section 74 of the spiral channel 71. Thereby, the outlet section 69, in contrast to the suction jet pump 60 shown in FIG. 3, the outlet section 69 of which primarily runs straight, curves in such a way that the pump outlet 63 is orientated in the direction of the air flowing through the end section 74 so that air flowing out of the pump outlet 63 primarily flows in the direction of the air from the outlet section 69 otherwise flowing through the end section 74. Furthermore, the pump outlet 63 is designed as a type of nozzle 78, also referred to in the following as an outlet nozzle 78, in order to increase the efficiency of the suction jet pump 60. In the case of this exemplary embodiment, the pump outlet 63 corresponds to the suction jet flow-in opening 65, which is arranged within the channel system 35 and the main channel 34, while the motive-fluid inlet 61 corresponds to the suction jet branch-off point 64.

Figure 6:
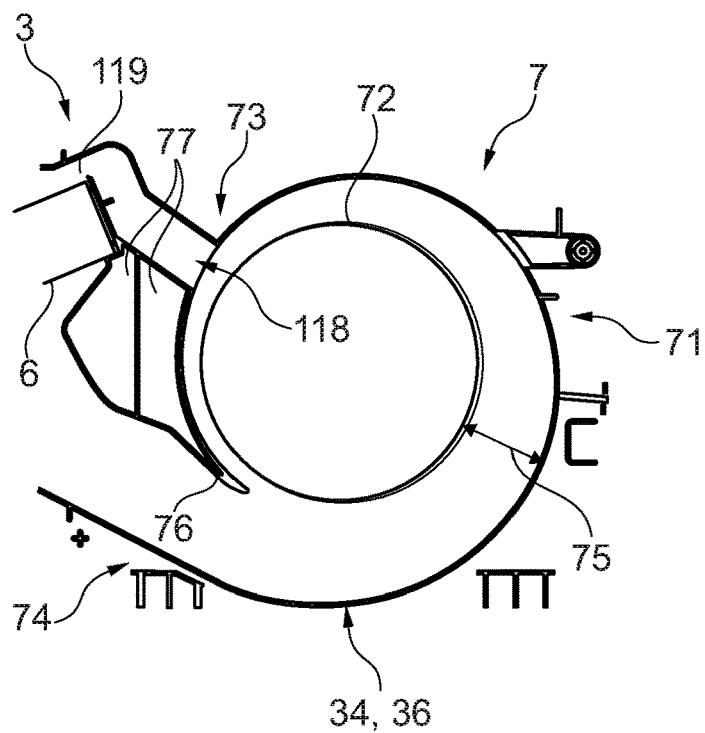
FIG. 6 shows the air-conditioning system from FIG. 4 in another sectional plane.

FIG. 6 shows the air-conditioning system from FIG. 4, wherein a section that is offset in comparison to FIG. 4 is shown. In the section shown in FIG. 6, in particular, the fluidic connection of the cooling channel 118 to the channel system 35 can be seen. For this purpose, the cooling channel 118 is connected to the channel system 35 via a cooling channel branch-off point 119, which is arranged downstream from the system filter device 6 and directly connected to it.

FIG. 7 again shows the cross-section from FIG. 4, however, in the case of another exemplary embodiment. This exemplary embodiment differs from the example shown in FIG. 4, in particular, by the fact that the suction jet branch-off point 64 is arranged downstream from the system filter device 6, wherein this is implemented by the suction jet branch-off point 64 being arranged within the cooling channel 118, in particular, designed in such a way. By means of this, on the one hand, the suction jet pump 60 is driven by the air filtered through the system filter device 6. On the other hand, the suction jet branch-off point 64 is arranged near the sensor device 9 so that the suction jet pump 60 is operated in a more effective manner overall and is space-saving. The efficiency and compactness is improved by means of the suction jet flow-in opening 65 being arranged on the side of the tongue 76 facing the impeller 72, in particular, being designed within the tongue 76. Within this area, surprisingly, a pronounced local vacuum in the air prevails so that the air is strongly sucked out of the suction jet pump 60. In addition or as an alternative, the sensor flow-in opening 58 is located on the side of the tongue 76 facing the impeller 72, in particular being designed within the tongue 76, so that air is strongly sucked out of the sensor device 9. As a result, in particular, a dirt or particle deposit within the sensor device 9 is avoided or at least reduced. In addition, at least such a sensor inlet 46 is fluidically connected to the cooling channel 118 located directly adjacent. Thereby, air cleaned by the system filter device 6 can be supplied to the sensor device 9 via the cooling channel 118 in order to analyse this, for example, and/or to use them to flush the sensor device 9 (see also FIG. 8 in the following).

Figure 8:
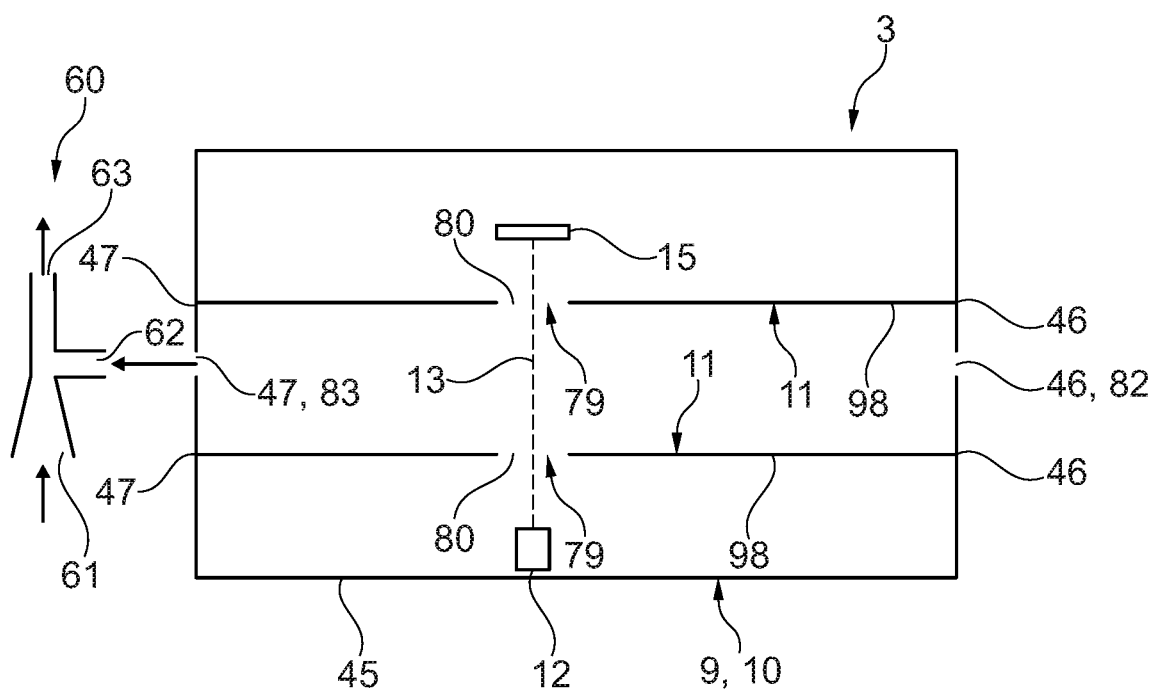
FIG. 8 shows a cross-section through the air-conditioning system within the range of a sensor device.

FIG. 8 shows another exemplary embodiment of the air-conditioning system 3, wherein, in FIG. 8, a cross-section through the sensor device 9 and the suction jet pump 60 can be seen. In the case of this exemplary embodiment, the sensor device 9 comprise two such analysis channels 11, which both are penetrated within the respective interaction section 79 by the emitted electromagnetic waves 13 and generated by the generation device 12 perpendicular to the analysis channel 11. Accordingly, in this example, no deflection device 97 is provided. The respective interaction section 79 is formed by such a break 80 of the respective analysis channel 11. By means of this, the interaction of the electromagnetic waves 13 with the analysis channel 11 itself, in particular, a channel sheath 98 of the analysis channel 11, is prevented or at least reduced so that the at least one characteristic of the air measured using the aid of the sensor device 9 takes place more precisely. In addition, in this exemplary embodiment, only one such detector 15 is provided, which detects the electromagnetic waves 13 after passing through both interaction sections 79 and the interaction with the air flowing through the respective analysis channel 11.

In the case of this exemplary embodiment, such a sensor inlet 46 hereinafter also referred to as the flushing-air inlet 82, serves to let flushing-air into the sensor housing 45. In addition, such a sensor outlet 47, hereinafter also referred to in the following as a flushing-air outlet 83, serves to discharge the flushing-air from the sensor housing 45. Using this flushing-air, the inside of the sensor housing 45 is flushed, thereby, in particular, hindering that air flowing through the analysis channel 11 in the interaction section 79 flows out of the analysis channel 11 and the sensor device 9, in particular, the generation device 12, and/or the detector 5 get dirty or that the dirt is at least reduced. Thereby, the flushing-air outlet 83 is fluidically connected to the suction inlet 62 of the suction jet pump 60 in such a way that the suction jet pump 60 sucks the flushing-air from the sensor housing 45, thereby flushing the sensor housing 45. The flushing-air inlet 82 can be fluidically connected to the cooling channel 118 (see FIGS. 4 to 7) so that air cleaned by the system filter device 6 flows into the sensor device 9 as flushing-air. As an alternative, it is conceivable to do without the flushing-air inlet 82 so that, via the flushing-air outlet 83, with the aid of the suction jet pump 60, air is sucked from the sensor housing 45 in order to prevent dirtiness as much as possible or to keep them at a low level.

Figure 9:
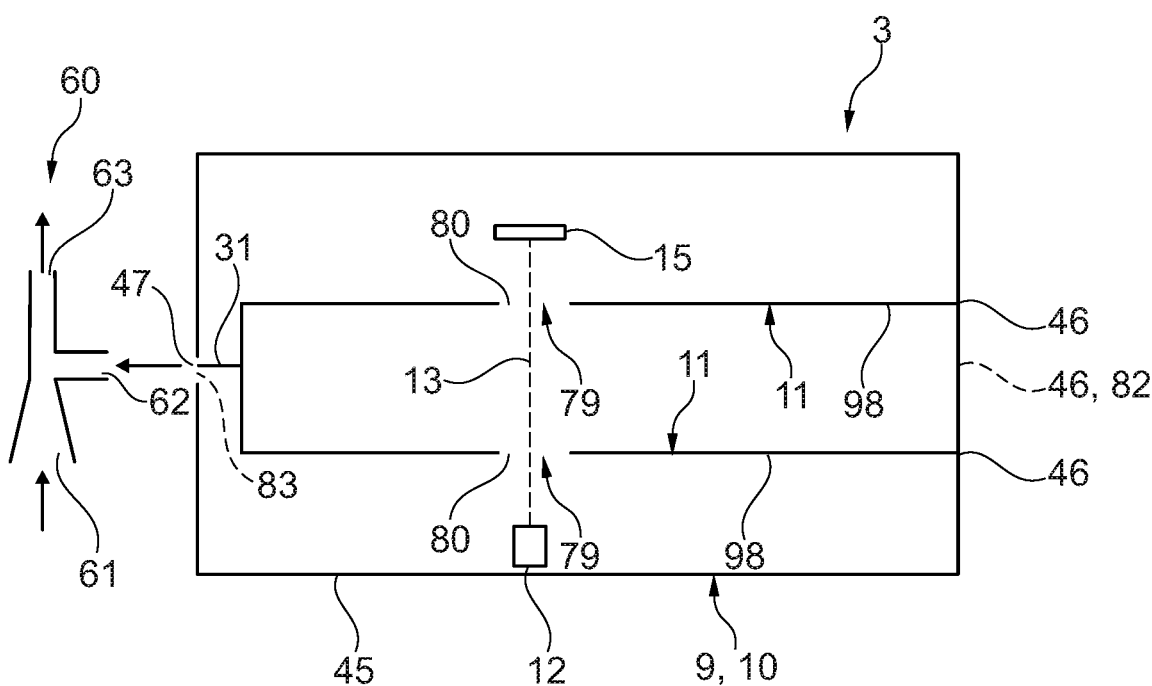
FIG. 9 shows the view from FIG. 8 in the case of another exemplary embodiment.

In FIG. 9, the view from FIG. 8 can be seen, however in the case of another exemplary embodiment. This differs from the example shown in FIG. 8 by the fact that no flushing-air inlet 82 and no flushing-air outlet 83 are provided. In addition, both analysis channels 11 are connected to the suction inlet 62 of the suction jet pump 60 via such a sensor discharge channel 31. By means of this, air is removed from the sensor housing 45 via the breaks 80 of the analysis channels 11 forming the interaction section 79 and the sensor discharge channel 31 with the aid of the suction jet pump 60 in order to thereby prevent or at least reduce a dirtiness within the sensor housing 45. As an alternative, it is conceivable to introduce flushing-air into the sensor housing 45 via such a flushing-air inlet 82 indicated with a dashed line and to generate a vacuum within the sensor housing 45, in particular, a low-level vacuum. The air is then The air is then sucked out of the sensor housing 45 via the breaks 80 and the suction jet pump 60 thereby maintaining the vacuum and the leaves the sensor device 9 via the sensor outlet 47. In this case, the sensor outlet 47 also acts as a flushing-air outlet 83, as is indicated with the dashed line.

Figure 10:
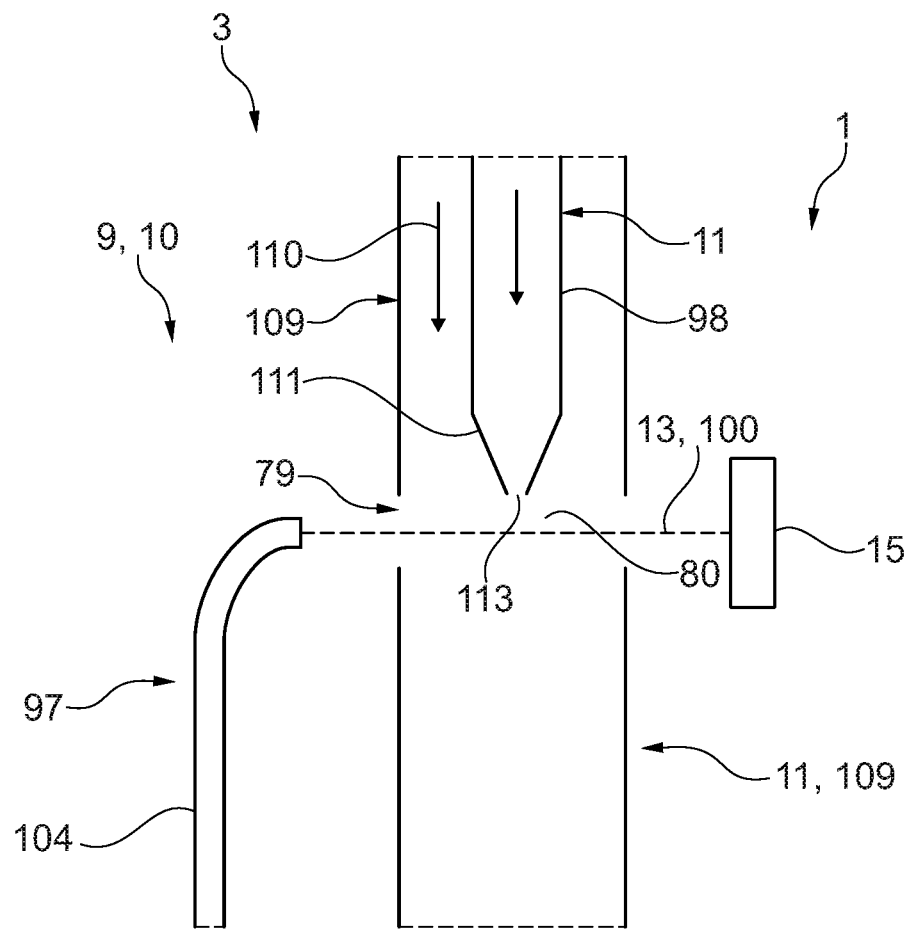
FIG. 10 shows a longitudinal cross-section through a sensor device of the air-conditioning system in the case of another exemplary embodiment.

FIG. 10 shows a cross-section through the sensor device 9 and the air-conditioning system 3 in another exemplary embodiment, wherein a longitudinal section through such an analysis channel 11 can be seen. Furthermore, only the deflection device 97, which comprises a conductor 104 belonging to the interaction section 79 of the analysis channel 11 shown, and the related detector 15 can be seen. In the case of this exemplary embodiment, the analysis channel 11 is surrounded by a sheath-air channel 109, which adjoins a sheath-air flow path 110 of the sheath air flowing through the sheath-air channel 109. The sheath air is preferably different from the air flowing through the analysis channel 11, in particular cleaned air, for example, air filtered by means of the system filter device 6 that may originate from such a cooling channel 118 (see FIGS. 4 to 7). The sheath-air flow path 110 surrounds the break 80 of the analysis channel 11, which forms the interaction section 79 in such a way that the sheath-air flow path 110 limits, on the outside, the flow of the air flowing through the analysis channel 11 through the interaction section 79 on the outside. In other words, the sheath-air flow path 110 prevents that air flowing through the analysis channel 11 in the interaction section 79 flows out of the analysis channel 11 and the sensor device 9, in particular, the generation device 12, the respective detector 5 and/or the deflection device 97 is dirtied. The sheath-air channel 109 preferably comprises a break 80 that is aligned with the break 80 of the analysis channel 11, thereby being aligned to the interaction section 79, wherein the breaks 80 of the channels 11, 109 are arranged in such a way that the related deflected electromagnetic waves 13 penetrate through these without interaction with the channel sheath 98 and the sheath-air channel 109. Since the sheath air is cleaned and filtered air, thereby, the interaction of the deflected electromagnetic waves 13 with the sheath air is prevented or at least reduced.

In the case of this exemplary embodiment, the analysis channel 11 in the sheath-air channel 109 downstream from the interaction section 79 run together and are uniform. That means that the air and the sheath air flowing through the analysis channel 11 are mixed and are led together downstream from the interaction section 79. In particular, this mixture can be traced back to the channel system 39 via the sensor outlet 47. If the sensor outlet 47 is fluidically connected to the suction inlet 62 of the suction jet pump 60, both the air can be conveyed through the analysis channel 11 as well as the sheath air using the suction jet pump 60.

In the case of this exemplary embodiment, the analysis channel 11 comprises a channel nozzle 111 flowing into the interaction section 79. The channel nozzle 111 is tapered in the flow direction of the air flowing through the analysis channel 11 in the flow direction to the interaction section 79. As a result, and escape of the air flowing through the analysis channel 11 outside of the interaction section 79, in particular, into the sensor housing 45 is prevented or at least reduced.

The invention claimed is:

1. An air-conditioning system of a motor vehicle to air-condition a vehicle interior, comprising:
 a channel system configured to allow air to flow therethrough during operation;
 a conveyor positioned in the channel system and configured to convey air in the channel system, wherein the conveyor separates a suction area of the channel system arranged upstream of the conveyor from a pressure area of the channel system arranged downstream from the conveyor;
 a sensor comprising at least one analysis channel and configured to measure a characteristic of air flowing through the at least one analysis channel, wherein the sensor further comprises a sensor outlet configured to release air from the sensor;
 a suction jet pump including a motive-fluid inlet, a suction inlet, and a pump outlet;
 wherein a suction jet branch-off point is disposed in the pressure area and connects the motive-fluid inlet to the channel system;

wherein the suction inlet is fluidically connected to the sensor outlet;

wherein the conveyor comprises a spiral-shaped spiral channel of the channel system;

wherein the spiral channel includes a start section via which air flows into the spiral channel from the suction area during operation;

wherein the spiral channel includes an end section via which air flows from the spiral channel into the pressure area during operation; and wherein the suction jet branch-off point is arranged within the end section of the spiral channel.

2. The air-conditioning system according to claim 1, wherein a suction jet flow-in opening connects the pump outlet to the channel system such that, during operation, air flows from the suction jet pump, through the pump outlet, to the suction jet flow-in opening, and into the channel system.

3. The air-conditioning system according to claim 1, wherein:

an impeller is arranged in the spiral channel to convey the air;

the spiral channel longitudinally extends between the start section and the end section;

a flow cross-section of the spiral channel enlarges in a continuous manner from the start section to the end section;

between the start section and the end section, a hollow space is formed that is fluidically separated from the spiral channel; and the sensor is arranged in the hollow space.

4. The air-conditioning system according to claim 3, wherein the suction jet pump extends through the spiral channel.

5. The air-conditioning system according to claim 2, wherein the suction jet flow-in opening is arranged downstream from the suction jet branch-off point within the channel system such that, during operation, air flows from the suction jet branch-off point to the suction jet pump and then to the suction jet flow-in opening.

6. The air-conditioning system according to claim 2, wherein the suction jet flow-in opening is arranged in the suction area.

7. The air-conditioning system according to claim 3, wherein the suction jet pump comprises an outlet section extending between the motive-fluid inlet and the pump outlet, the outlet section extending through a tongue of the end section facing the impeller.

8. The air-conditioning system according to claim 3, wherein:

the conveyor includes a drive mechanism configured to drive the impeller;

a cooling channel connects the drive mechanism to the channel system between the start section and the end section of the spiral channel;

the cooling channel is configured to, during operation, lead air for cooling the drive mechanism to the drive mechanism; and the sensor includes at least one sensor inlet that is fluidically connected to the cooling channel.

9. The air-conditioning system according to claim 1, further comprising a system filter fluidically connected to the channel system and arranged upstream of the conveyor such that, during operation, air flows from the system filter to the conveyor; and wherein the suction jet branch-off point is arranged downstream from the system filter such that, during operation, filtered air flows from the system filter to the suction jet branch-off point.

10. The air-conditioning system according to claim 3, wherein:

the pump outlet is fluidically connected to the channel system via a suction jet flow-in opening;

the end section comprises a tongue facing the impeller; and the suction jet flow-in opening is arranged on a side of the tongue facing the impeller.

11. The air-conditioning system according to claim 1, wherein:

the at least one analysis channel comprises an interaction section;

the at least one analysis channel comprises a channel sheath adjoining the at least one analysis channel, in which the interaction section is designed as a break of the channel sheath; and the interaction section is surrounded by a sheath-air flow path during operation configured to limit a flow of the air through the interaction section.

12. The air-conditioning system according to claim 11, wherein the sheath-air flow path is fluidically connected to the sensor outlet.

13. The air-conditioning system according to claim 1, wherein:

the sensor further comprises a sensor housing, the at least one analysis channel arranged in the sensor housing;

the sensor further comprises a flushing-air inlet configured to introduce flushing-air into the sensor housing to flush the sensor housing, and a flushing-air outlet configured to release flushing-air from the sensor housing; and the flushing-air outlet is fluidically connected to the suction inlet of the suction jet pump.

14. A vehicle, comprising a vehicle interior and an air-conditioning system, the air-conditioning system including:

an air channel system;

a conveyor positioned within the air channel system and configured to convey air in the air channel system, wherein the conveyor separates a suction area of the air channel system arranged upstream of the conveyor from a pressure area of the air channel system arranged downstream from the conveyor;

an air characteristic sensor comprising a sensor inlet and a sensor outlet and configured to measure a characteristic of air flowing therethrough;

a suction jet pump comprising a motive-fluid inlet, a suction inlet, and a pump outlet;

wherein the motive-fluid inlet is fluidically connected to the pressure area via a suction jet branch-off point within the air channel system;

wherein the conveyor comprises a spiral-shaped spiral channel of the channel system;

wherein an impeller is arranged in the spiral channel to convey the air;

wherein the spiral channel comprises a start section and an end section between which a flow cross-section of the spiral channel enlarges in a continuous manner;

wherein, between the start section and the end section, a hollow space is formed that is fluidically separated from the spiral channel;

wherein the sensor is arranged in the hollow space; and wherein the suction jet branch-off point is arranged within the end section of the spiral channel.

15. The vehicle of claim 14, wherein:
the air characteristic sensor further comprises an analysis channel having a break therein;
the analysis channel further comprises a channel sheath; and
the channel sheath is configured to have a sheath-air flow pass therethrough configured to bound air flowing through the analysis channel as the air flowing through the analysis channel passes adjacently to the break.

16. The air-conditioning system according to claim 1, wherein:
a suction jet flow-in opening connects the pump outlet to the channel system;
during operation, a first airflow flows successively from a first portion of the channel system disposed in the suction area to the conveyor, to a second portion of the channel system disposed in the pressure area, to the suction jet branch-off point, to the motive-fluid inlet, through the suction jet pump to the pump outlet, to the suction jet flow-in opening, and back into the channel system; and
during operation, a second airflow flows successively from the sensor to the sensor outlet, to the suction inlet, and into the suction jet pump where the second airflow and the first airflow merge.

17. The air-conditioning system according to claim 1, wherein:
the start section and the end section are disposed at opposite ends of the spiral channel; and
a flow cross-section of the spiral channel enlarges in a continuous manner along an entire length of the spiral channel from the start section to the end section.

\* \* \* \* \*